United States Patent
Koike et al.

(10) Patent No.: US 12,435,759 B2
(45) Date of Patent: Oct. 7, 2025

(54) BEARING DEVICE AND ELECTRIC VERTICAL TAKE-OFF AND LANDING AIRCRAFT

(71) Applicant: NTN Corporation, Osaka (JP)

(72) Inventors: Takashi Koike, Iwata (JP); Yusuke Shibuya, Iwata (JP)

(73) Assignee: NTN Corporation, Osaka (JP)

( * ) Notice: Subject to any disclaimer, the term of this patent is extended or adjusted under 35 U.S.C. 154(b) by 211 days.

(21) Appl. No.: 18/284,830

(22) PCT Filed: Mar. 28, 2022

(86) PCT No.: PCT/JP2022/015054
§ 371 (c)(1),
(2) Date: Sep. 28, 2023

(87) PCT Pub. No.: WO2022/210559
PCT Pub. Date: Oct. 6, 2022

(65) Prior Publication Data
US 2024/0183394 A1   Jun. 6, 2024

(30) Foreign Application Priority Data
Mar. 30, 2021   (JP) ................. 2021-057707

(51) Int. Cl.
*F16C 32/04*   (2006.01)
*F16C 41/00*   (2006.01)
(Continued)

(52) U.S. Cl.
CPC .......... *F16C 32/0474* (2013.01); *F16C 41/00* (2013.01); *F16C 41/004* (2013.01);
(Continued)

(58) Field of Classification Search
CPC .... F16C 32/0474; F16C 41/00; F16C 41/004; F16C 2233/00; F16C 2326/43;
(Continued)

(56) References Cited

U.S. PATENT DOCUMENTS

| 4,688,951 A | 8/1987 | Guers |
| 6,989,618 B2 * | 1/2006 | Fukuyama ............. H02K 7/088 310/90 |

(Continued)

FOREIGN PATENT DOCUMENTS

| JP | 2002-130263 A | 5/2002 |
| JP | 2008-281025 A | 11/2008 |

(Continued)

OTHER PUBLICATIONS

International Search Report issued in International Application No. PCT/JP2022/015054 dated Jun. 14, 2022 with English translation.

*Primary Examiner* — Ahmed Elnakib
(74) *Attorney, Agent, or Firm* — Rimon P.C.

(57) ABSTRACT

A first seal and a second seal seal an annular space between an outer ring and an inner ring by sandwiching a retainer. A stator including a coil is supported by the first seal and is opposed to a magnetic ring. A sensor, a wireless communication circuit, and a power supply circuit are supported by the second seal. A wire electrically connects the coil and the power supply circuit. The wire includes a part disposed in a groove extending in an axial direction of a bearing on an outer peripheral surface of the outer ring.

9 Claims, 10 Drawing Sheets

(51) Int. Cl.
*H02K 1/02* (2006.01)
*H02K 1/12* (2006.01)
*H02K 5/15* (2006.01)
*H02K 5/18* (2006.01)
*H02K 7/09* (2006.01)

(52) U.S. Cl.
CPC ................ *H02K 1/02* (2013.01); *H02K 1/12* (2013.01); *H02K 5/15* (2013.01); *H02K 5/18* (2013.01); *H02K 7/09* (2013.01); *F16C 2233/00* (2013.01); *F16C 2326/43* (2013.01)

(58) Field of Classification Search
CPC ....................... F16C 33/6607; F16C 33/7826; F16C 33/783; F16C 35/067; F16C 37/007; F16C 2202/24; F16C 2206/40; F16C 2380/26; F16C 33/3856; F16C 33/585; F16C 33/586; F16C 19/525; F16C 19/527; F16C 33/32; F16C 2202/42; F16C 2208/00; F16C 33/7856; F16C 41/007; F16C 41/008; F16C 19/06; H02K 1/02; H02K 1/12; H02K 5/15; H02K 5/18; H02K 7/09; B64C 29/0025; B64D 31/16; F16J 15/326

USPC ........................................................ 310/90.5
See application file for complete search history.

(56) References Cited

U.S. PATENT DOCUMENTS

| | | | |
|---|---|---|---|
| 2002/0051593 A1* | 5/2002 | Oka | F16C 33/7889 384/448 |
| 2003/0030565 A1* | 2/2003 | Sakatani | G01M 13/045 340/682 |
| 2017/0023065 A1 | 1/2017 | Kamamoto et al. | |

FOREIGN PATENT DOCUMENTS

| | | |
|---|---|---|
| JP | 2014-092225 A | 5/2014 |
| JP | 2017-026027 A | 2/2017 |
| JP | 2017-072170 A | 4/2017 |
| JP | 2019-074098 A | 5/2019 |
| JP | 2021-037935 A | 3/2021 |

* cited by examiner

BEARING DEVICE AND ELECTRIC VERTICAL TAKE-OFF AND LANDING AIRCRAFT

CROSS REFERENCE TO RELATED APPLICATIONS

This application is the U.S. National Phase under 35 U.S.C. § 371 of International Application No. PCT/JP2022/015054, filed on Mar. 28, 2022, which claims the benefit of Japanese Application No. 2021-057707, filed on Mar. 30, 2021, and the entire contents of each are hereby incorporated by reference.

TECHNICAL FIELD

The present invention relates to a bearing device and an electric vertical take-off and landing aircraft.

BACKGROUND ART

It is known that a generator is combined with a bearing to be used as a power supply for a sensor, wireless communication, or the like. A bearing with a wireless sensor disclosed in Japanese Patent Laying-Open No. 2017-72170 (PTL 1) includes a first bearing ring, a second bearing ring, a plurality of rolling elements provided between the first bearing ring and the second bearing ring, a retainer that holds the rolling elements, and an annular seal that closes between the first bearing ring and the second bearing ring as members configuring the bearing. The bearing with the wireless sensor further includes a multipolar ring magnet integrally molded with the retainer, a sensor provided inside the bearing ring, a coil provided on a seal opposite to the multipolar ring magnet, a transmission antenna provided on a surface of the seal opposite to the multipolar ring magnet or a surface on an opposite side of the surface, wireless processing circuitry provided on a side of the seal opposite to the multipolar ring magnet, and a power supply circuit as a wireless sensor function.

CITATION LIST

Patent Literature

PTL 1: Japanese Patent Laying-Open No. 2017-72170

SUMMARY OF INVENTION

Technical Problem

The coil described in PTL 1 is very thin because the coil is formed by a thin film pattern forming method such as an etching method using a conductor such as copper as a material. However, on an insulating film such as rubber that coats a core metal of the seal, a component having a height higher than that of the coil, for example, a control circuit, a wireless circuit, an antenna, a power supply circuit, a protective cover that covers them, and the like are provided. Thus, it is assumed that it is difficult to narrow a gap between the multipolar ring magnet and the coil, and power generation efficiency is reduced.

In addition, heat generated by power generation during rotation of the bearing is easily conducted to the sensor. For this reason, it is difficult to accurately detect a physical property related to the bearing such as a temperature rise generated by the rotation of the bearing.

The present invention has been made to solve the above problems, and an object of the present invention is to provide a bearing device and an electric vertical take-off and landing aircraft capable of improving the power generation efficiency and measuring the physical property of the bearing without being affected by the heat generated from the generator.

Solution to Problem

A bearing device of the present invention includes a bearing, a magnetic ring, a stator, at least one sensor, a wireless communication circuit, a power supply circuit, and a wire. The bearing includes an outer ring, an inner ring disposed on a radially inside of the outer ring, a plurality of rolling elements rollably disposed in an annular space between the outer ring and the inner ring, a retainer that holds the plurality of rolling elements at intervals in a circumferential direction, and a first seal and a second seal that seal the annular space by sandwiching the retainer with the first seal and the second seal. The magnetic ring is supported by the retainer and has N poles and S poles alternately arranged. The stator is supported by the first seal and has a coil opposite to the magnetic ring. The at least one sensor is supported by the second seal and detects a physical property of the bearing. The wireless communication circuit is supported by the second seal and wirelessly transmits output of the at least one sensor to the outside. The power supply circuit is supported by the second seal and supplies DC power generated by performing rectification processing of power generated by a generator including the magnetic ring and the stator to the at least one sensor and the wireless communication circuit. The wire electrically connects the coil and the power supply circuit. The wire is disposed in a first groove provided on either an outer peripheral surface of the outer ring or an inner peripheral surface of the inner ring.

In the bearing device, the wire is provided in one of an end face of the outer ring and an end face of the inner ring and disposed in a second groove connected to the first groove.

The bearing device further includes further comprising a heat insulating unit disposed on an outer peripheral side and an inner peripheral side of the stator in a radial direction of the bearing. The stator abuts on at least one of the outer ring and the inner ring with the heat insulating unit interposed therebetween.

In the bearing device, the stator includes a core metal. The core metal is made of either a magnetic material or a soft magnetic material.

In the bearing device, the stator includes a first surface on the retainer side and a second surface that is a back surface of the first surface. The second surface of the stator is exposed to an outside from the heat insulating unit.

In the bearing device, the second seal includes a reinforcing member, and the reinforcing member is made of an insulating material.

In the bearing device, the plurality of rolling elements are made of an insulating material.

In the bearing device, at least one of the first seal and the second seal includes a detaching unit detached from the inner ring and the outer ring.

An electric vertical take-off and landing aircraft of the present invention includes: the bearing device; and a rotor blade rotatably supported by the bearing device, in which the electric vertical take-off and landing aircraft flies by rotation of the rotor blades.

Advantageous Effects of Invention

According to the present invention, the bearing device and the electric vertical take-off and landing aircraft capable of increasing the power generation efficiency and measuring the physical property of the bearing without being affected by the heat generated from the generator can be implemented.

DESCRIPTION OF EMBODIMENTS

Figure 1:
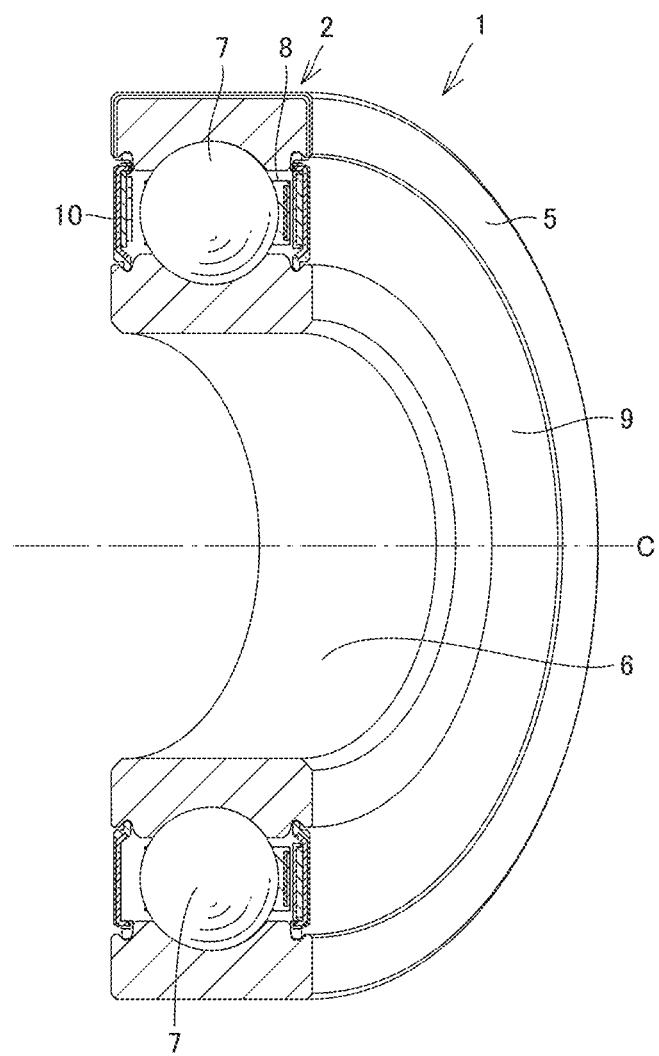
FIG. 1 is a partially broken perspective view illustrating a configuration of a bearing device according to a first embodiment.

Hereinafter, embodiments of the present invention will be described with reference to the drawings. In the drawings, the same or corresponding portion is denoted by the same reference numeral, and the description will not be repeated.

First Embodiment

<Configuration of Bearing Device>

With reference to FIGS. 1 to 5, a configuration of a bearing device according to a first embodiment will be described below.

As illustrated in FIG. 1, for example, a bearing device 1 of the first embodiment is a bearing with a wireless sensor, and includes a bearing 2. Bearing 2 includes an outer ring 5, an inner ring 6, a plurality of rolling elements 7, a retainer 8, a first seal 9, and a second seal 10.

Each of outer ring 5 and inner ring 6 is a bearing ring having an orbital plane and has an annular shape. Inner ring 6 is disposed radially inside outer ring 5. Both outer ring 5 and inner ring 6 are arranged concentrically around a shaft line C. Shaft line C is an imaginary straight line extending in an axial direction of bearing 2. A radial direction of bearing 2 is a direction orthogonal to the axial direction of bearing 2.

The bearing ring of outer ring 5 is provided on an inner peripheral surface 5f of outer ring 5. The bearing ring of inner ring 6 is provided on an outer peripheral surface of inner ring 6. The orbital plane of outer ring 5 and the orbital plane of inner ring 6 are opposite to each other in the radial direction of bearing 2.

Each of the plurality of rolling elements 7 is rollably disposed in an annular space between outer ring 5 and inner ring 6. Each of the plurality of rolling elements 7 is disposed so as to abut on each of the orbital plane of outer ring 5 and the orbital plane of inner ring 6. Retainer 8 has an annular shape and is made of, for example, resin. Retainer 8 holds the plurality of rolling elements 7 at intervals in a circumferential direction so as to be rollable.

Each of first seal 9 and second seal 10 has an annular shape and is disposed between outer ring 5 and inner ring 6. First seal 9 and second seal 10 seal the annular space by sandwiching retainer 8 between first seal 9 and second seal 10. A lubricant such as lubricating grease is put in the annular space sealed by first seal 9 and second seal 10.

Figure 2:
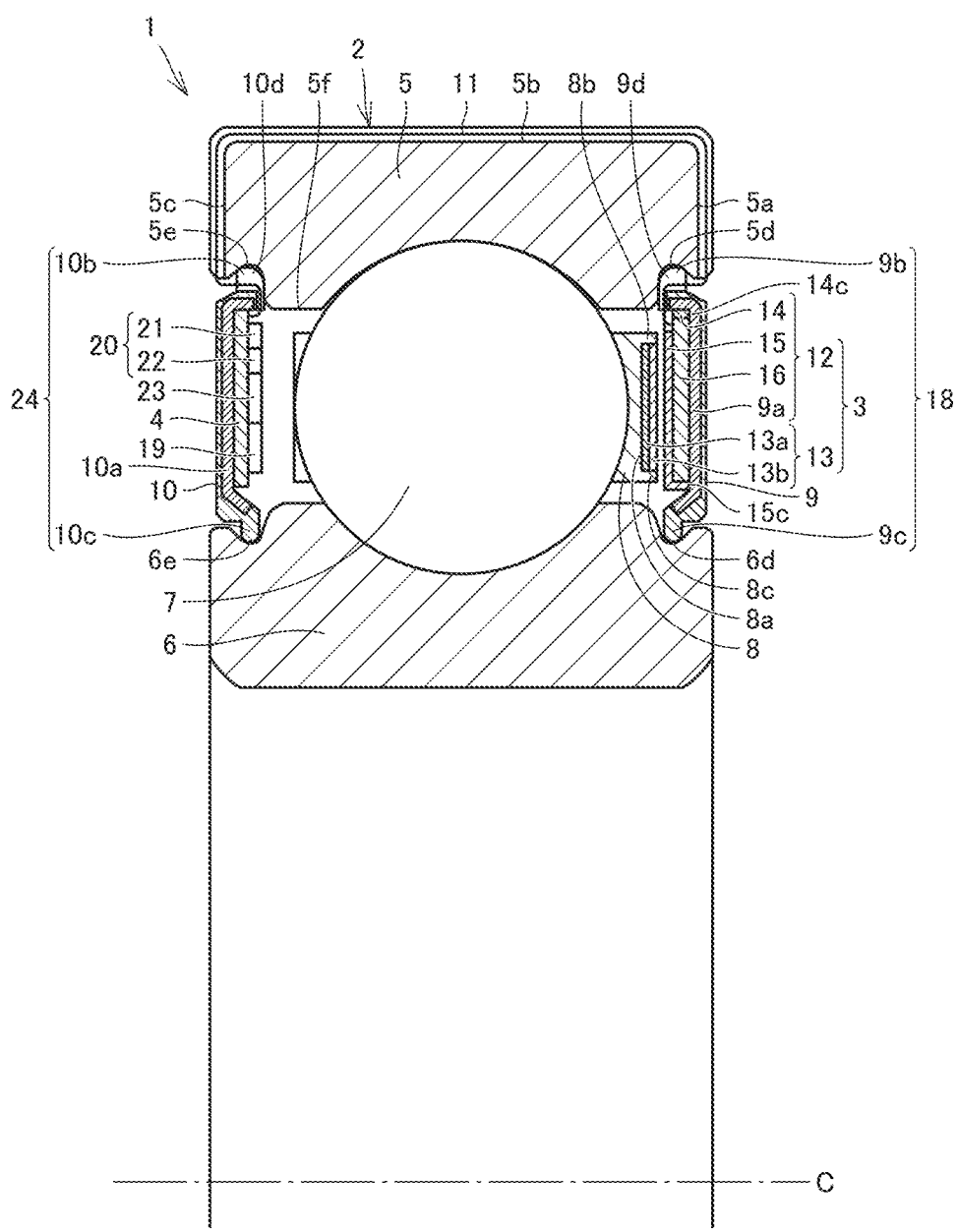
FIG. 2 is a partially enlarged sectional view illustrating a part of the bearing device in FIG. 1.

As illustrated in FIG. 2, first seal 9 has a configuration in which an elastic body (for example, rubber) is bonded to an annular core metal 9a made of metal such as a rolled steel plate. First seal 9 has a rubber lip 9b on an outer peripheral portion and a seal lip 9c on an inner peripheral portion. Each of rubber lip 9b and seal lip 9c is a part of the elastic body bonded to core metal 9a. Rubber lip 9b is fixed to outer ring 5 by being inserted into a seal groove 5d of outer ring 5. Seal lip 9c slides against or in contact with a seal groove 6d of inner ring 6 with a gap. Rubber lip 9b and seal lip 9c are formed of rubber or the like of an elastic member, and configure a heat insulating unit 18.

Second seal 10 has a configuration in which the elastic body (for example, rubber) is vulcanized and bonded to a reinforcing member 10a corresponding to the core metal. Reinforcing member 10a is made of an insulating member (non-conductive member), and for example, is made of a resin material, a fiber-reinforced resin, carbon fiber, or the like. Second seal 10 has a rubber lip 10b on the outer peripheral portion and a seal lip 10c on the inner peripheral portion. Each of rubber lip 10b and seal lip 10c is a part of the elastic body that is vulcanized and bonded to reinforcing member 10a. Rubber lip 10b is fixed to outer ring 5 by being inserted into a seal groove 5e of outer ring 5. Seal lip 10c slides against or in contact with a seal groove 6e of inner ring 6 with a gap. Rubber lip 10b and seal lip 10c are made of rubber or the like of the elastic member, and configure a heat insulating unit 24.

Bearing device 1 of the first embodiment further includes a generator 3, a circuit board 4, a power supply circuit 19, a sensor 20, and a wireless communication circuit 23.

Generator 3 is, for example, a claw pole generator, and includes a stator 12 and a magnetic ring 13. Stator 12 is attached to an inner end face of first seal 9 opposite to retainer 8. Magnetic ring 13 is attached to an end face on a non-release side of retainer 8 opposite to first seal 9. Stator 12 and magnetic ring 13 are opposite to each other with a gap in the axial direction of bearing 2.

Magnetic ring 13 is fixed to a recess 8a provided on the end face on the non-release side of retainer 8 by fitting, by fixing with an adhesive, or using both. A reversal (not illustrated) or the like may be provided in protrusions 8b, 8c provided at both ends of recess 8a to prevent magnetic ring 13 from being detached from recess 8a.

Magnetic ring 13 includes a core metal 13a and a multipolar magnet 13b. Multipolar magnet 13b is supported by retainer 8 with core metal 13a interposed therebetween.

Figure 3:
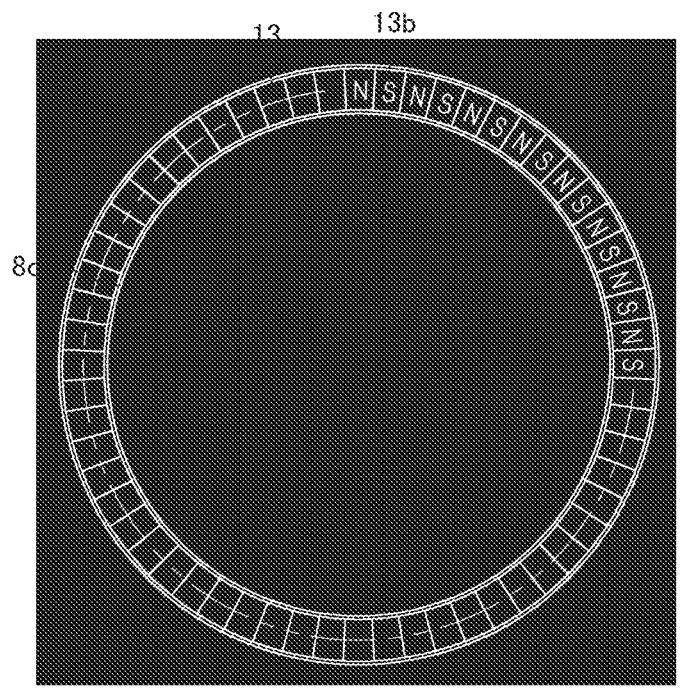
FIG. 3 is a side view in which a magnetic ring is supported on an end face of a retainer, and is a view illustrating a state of magnetization of the magnetic ring.

Multipolar magnet 13b is opposite to stator 12 with a gap in the axial direction of bearing 2. For example, multipolar magnet 13b is formed by vulcanizing and bonding a magnetic material obtained by kneading magnetic powder and rubber to core metal 13a, and then alternately magnetizing N poles and S poles in the circumferential direction as illustrated in FIG. 3.

Stator 12 includes core metal 9a, two magnetic ring members 14, 15, and a coil 16. Stator 12 is not in direct contact with outer ring 5 and inner ring 6, but is supported by bearing 2 with a member (rubber lip 9b, seal lip 9c) made of a material (for example, rubber or resin) having low thermal conductivity (high heat insulating property) interposed therebetween. Core metal 9a is shared by stator 12 and first seal 9. Core metal 9a is made of metal, and is made of either a magnetic material or a soft magnetic material. When the soft magnetic material such as permalloy, iron (pure iron, mild steel), permendur, silicon iron, or an amorphous metal material is used as the core metal 9a, power generation efficiency is improved.

For example, each of magnetic ring members 14, 15 is made of a metal material (magnetic material) such as a rolled steel plate. When the soft magnetic material having high magnetic permeability together with the material of core metal 9a is used as the material of magnetic ring members 14, 15, the power generation efficiency is improved.

Figure 4:
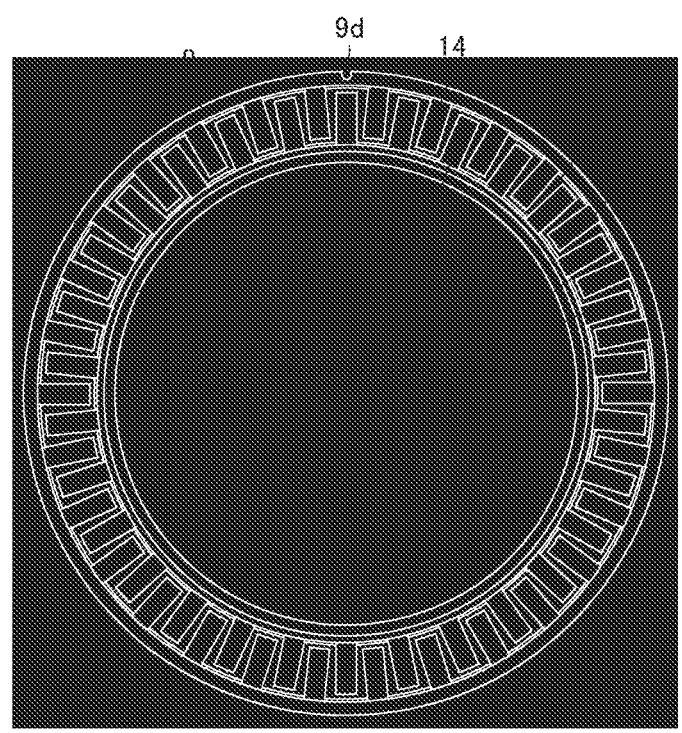
FIG. 4 is a view illustrating a stator, and is a side view illustrating an inner end face of a first seal as viewed from an inside of the bearing in FIG. 1.

As illustrated in FIG. 4, at one end of magnetic ring member 14, grooves 14a and claws 14b opened toward the axial direction of bearing 2 are alternately arranged in a comb shape in the circumferential direction. At one end of magnetic ring member 15, grooves 15a and claws 15b opened toward the axial direction of bearing 2 are alternately arranged in a comb shape in the circumferential direction. Claws 14b, 15b provided on two magnetic ring members 14, 15 are alternately arranged in the circumferential direction. Coil 16 is accommodated therein.

As illustrated in FIG. 2, the other end 14c of magnetic ring member 14 is in contact with core metal 9a of first seal 9 to form a magnetic path. The other end 15c of magnetic ring member 15 is in contact with core metal 9a of first seal 9 to form the magnetic path. As illustrated in FIGS. 2 and 4, in first seal 9, a notch 9d is provided at one location in the circumferential direction. Notch 9d is open to an outer peripheral end of first seal 9. Notch 9d is used for pulling out a wire 11 connected to coil 16 from the space (annular space) between outer ring 5 and inner ring 6 to the outside.

Figure 5:
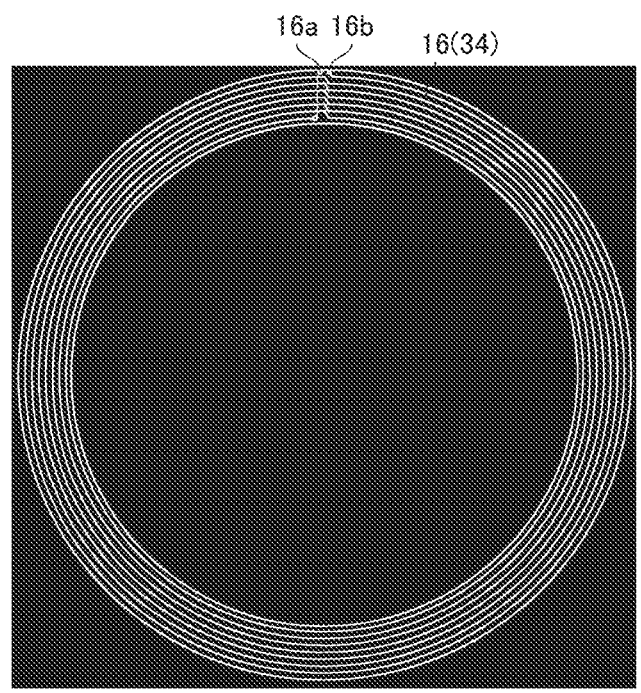
FIG. 5 is a side view illustrating a coil accommodated in the stator.

As illustrated in FIG. 5, for example, coil 16 is configured by winding a copper foil pattern around a surface of an annular substrate 17 in the circumferential direction. Coil 16 may be formed by winding a magnet wire a plurality of times in the circumferential direction of a cylindrical bobbin of an insulator (not illustrated), or by winding the magnet wire the plurality of times in a cylindrical shape without a bobbin. For example, the material of substrate 17 is glass epoxy. When the number of turns of coil 16 is increased, the number of turns of coil 16 may be adjusted using a multilayer substrate. A thickness and a coil width of the copper foil pattern are set in accordance with a specification of generator 3. An insulating film is formed on the surface of substrate 17, and coil 16 is insulated and protected. Instead of the insulating film, a thin insulating film or the like may be inserted into both surfaces of substrate 17.

A start point and an end point of coil 16 provided on substrate 17 are connected to terminals 16a, 16b, respectively. Wire 11 (FIG. 2) is connected to each of terminals 16a, 16b. A magnet wire (for example, enameled wire) in which an insulating layer is formed around a conductor such as a copper wire is used as wire 11. Wire 11 is drawn out from a connection portion with terminals 16a, 16b toward the side of second seal 10 through notch 9d of first seal 9.

As illustrated in FIG. 2, stator 12 is configured by inserting coil 16 into the magnetic path formed by core metal 9a of first seal 9 and magnetic ring members 14, 15. Stator 12 and magnetic ring 13 disposed opposite to stator 12 configure generator 3.

As described above, using core metal 9a of first seal 9 as a component of the magnetic path, the number of components can be reduced to thin stator 12. As another structure, a magnetic member (not illustrated) for the magnetic path may be inserted into the end face of core metal 9a.

Rubber lip 9b provided on the outer peripheral portion of first seal 9 and seal lip 9c provided on the inner peripheral portion are made of rubber of the elastic member or the like. For this reason, these become heat insulating unit 18, and even when heat is generated due to iron loss of stator 12 or the like, the generated heat is prevented from being conducted to the side of bearing 2. In addition, as compared with the conventional technique (PTL 1), stator 12 provided on the side surface of first seal 9 exists over the entire circumference in the circumferential direction around shaft line C, and the height of stator 12 is uniform. Thus, a gap between magnetic ring 13 supported by retainer 8 and multipolar magnet 13b can be narrowed, so that the power generation efficiency is improved.

Circuit board 4 is fixed to the surface of second seal 10 on the side of rolling element 7 by adhesion or the like. A heat insulating unit 24 made of an insulating material (rubber, resin, or the like) is formed on an outer peripheral portion and an inner peripheral portion of second seal 10 to which circuit board 4 is fixed. For this reason, circuit board 4 is insulated from outer ring 5 and inner ring 6. Circuit board 4 includes electric wiring. A protective film such as resin may be applied to the surface of circuit board 4. Power supply circuit 19, sensor 20, and wireless communication circuit 23 are mounted on circuit board 4. Each of power supply circuit 19, sensor 20, and wireless communication circuit 23 is electrically connected to the electric wiring of circuit board 4. In second seal 10, a notch 10d is provided at one location in the circumferential direction. Notch 10d is open to the outer peripheral end of second seal 10. Notch 10d is used for pulling out wire 11 connected to circuit board 4 from the space (annular space) between outer ring 5 and inner ring 6 to the outside.

Power supply circuit 19 performs rectification processing of AC power generated by generator 3 when inner ring 6 rotates and converts the AC power into DC power. Specifically, power supply circuit 19 performs smoothing processing of the AC power generated by generator 3 and obtains a constant voltage using a DC/DC converter. Power supply circuit 19 supplies the power (DC power) converted into DC to each of sensor 20 and wireless communication circuit 23. Each of sensor 20 and wireless communication circuit 23 is operated by the power supplied from power supply circuit 19.

For example, sensor 20 is a sensor that monitors the state of bearing 2, and detects a physical property (temperature, acceleration, or the like) of bearing 2. Sensor 20 may be one sensor or include a plurality of sensors. For example, sensor 20 may include a temperature sensor 21 and an acceleration sensor 22. Temperature sensor 21 is preferably mounted at a position close to a constructional member of bearing 2, for example, at a position close to inner peripheral surface 5f of outer ring 5, or at a position close to retainer 8 and rolling element 7. Sensor 20 may not be mounted on circuit board 4, but may be directly fixed to a stationary wheel of bearing 2 and connected to circuit board 4 by wiring (not illustrated).

Wireless communication circuit 23 wirelessly transmits the output of sensor 20 to the outside. For example, in the case where Bluetooth Low Energy (a frequency is 2.4 GHz and a wavelength λ is about 125 mm) is used as wireless communication circuit 23, a radio wave is easily emitted to the outside of bearing device 1 when a gap of the insulator wider than λ/2 exists.

When the radio wave is wanted to be emitted to the side of first seal 9, each of rolling element 7 and retainer 8 may be configured of the insulating material. Thus, the space sandwiched between outer ring 5 and inner ring 6 becomes the insulator, and rubber lip 9b and seal lip 9c of first seal 9 are the insulator such as rubber, so that wireless communication can be performed subject to a condition of a size of the insulator. For example, rolling element 7 made of the insulating material may be made of insulating ceramic. For example, retainer 8 made of the insulating material may be made of resin.

When signal processing of sensor 20 is required, circuitry may be mounted on circuit board 4. A battery (storage battery) (not illustrated) may be mounted on circuit board 4. The battery may be used as a power supply when the power supply is stabilized and when power cannot be generated.

Wire 11 connected to coil 16 is pulled out to the outside from the space (annular space) between outer ring 5 and inner ring 6 through notch 9d provided on the outer periphery of rubber lip 9b of first seal 9. Wire 11 drawn out from the annular space to the outside is disposed in grooves 5a, 5b, 5c of outer ring 5. Groove 5b (first groove) of outer ring 5 is provided on the outer peripheral surface of outer ring 5. For example, groove 5b extends in the axial direction (the direction parallel to shaft line C) of bearing 2 on the outer peripheral surface of outer ring 5. Groove 5a (second groove) of outer ring 5 is provided on the end face of outer ring 5 on the side of first seal 9. For example, groove 5a extends in the radial direction of bearing 2 on the end face of outer ring 5 on the side of first seal 9, and is connected to groove 5b. Groove 5c (second groove) of outer ring 5 is provided on the end face of outer ring 5 on the side of second seal 10. For example, groove 5c extends in the radial direction of bearing 2 on the end face of outer ring 5 on the side of second seal 10, and is connected to groove 5b. Wire 11 passes through grooves 5a, 5b, 5c, and is connected to circuit board 4 through notch 10d provided on the outer periphery of rubber lip 10b of second seal 10. Thus, generator 3 and power supply circuit 19 are electrically connected.

Wire 11 may be pulled out from the annular space using the elasticity of rubber lips 9b, 10b formed of rubber or the like without providing notches 9d, 10d. In addition, excess wire 11 may be folded back and stored in grooves 5a, 5b, 5c to be fixed with the adhesive so as not to protrude from the surface of outer ring 5, or fixed by filling grooves 5a, 5b, 5c with a resin member or the like.

<Electric Connection State of Each Portion>

Figure 6:
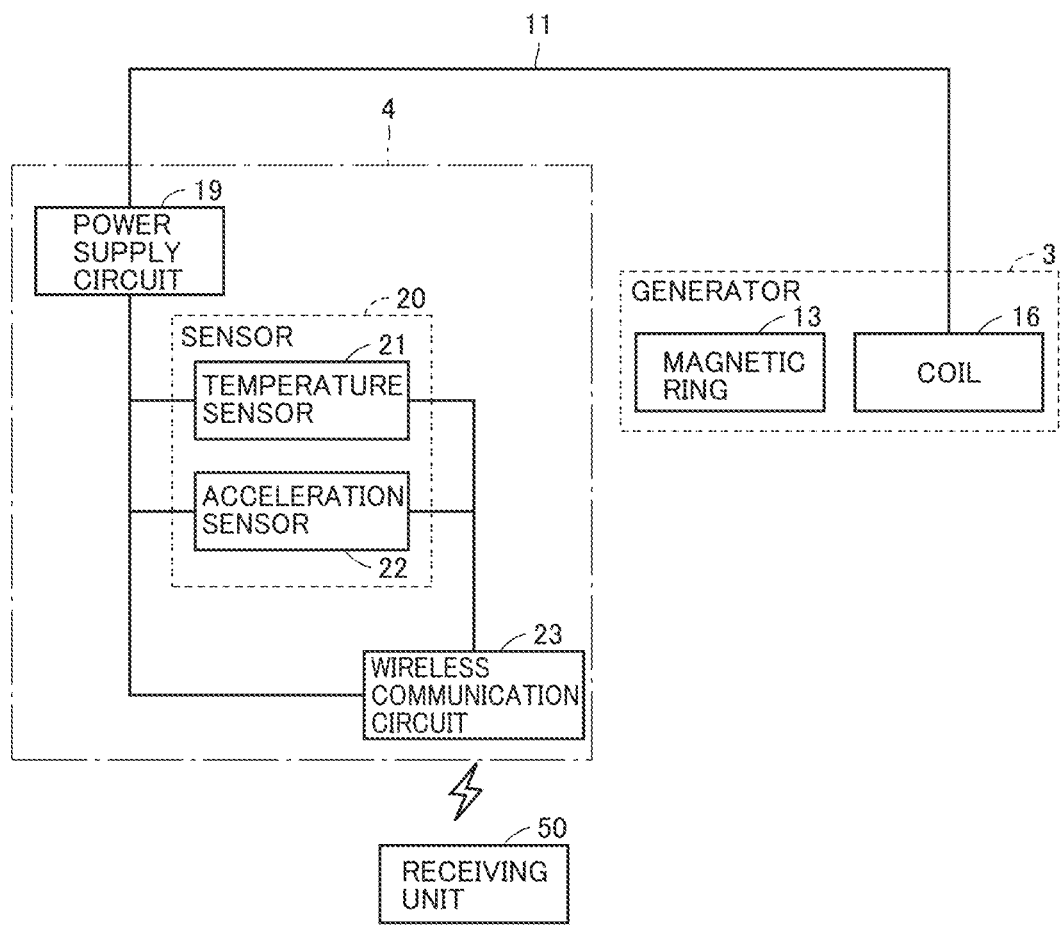
FIG. 6 is a view illustrating electric connection of a coil, a power supply circuit, a sensor, and a wireless communication circuit.

With reference to FIG. 6, an electric connection state of coil 16, power supply circuit 19, sensor 20, and wireless communication circuit 23 in the first embodiment will be described below.

As illustrated in FIG. 6, wire 11 is electrically connected to coil 16. Wire 11 is electrically connected to the electric wiring of circuit board 4. Each of power supply circuit 19, sensor 20, and wireless communication circuit 23 is electrically connected to the electric wiring of circuit board 4. Each of sensor 20 (for example, temperature sensor 21 and acceleration sensor 22) and wireless communication circuit 23 is electrically connected to the electrical wiring of circuit board 4 so as to be supplied with the DC power generated by power supply circuit 19. In addition, wireless communication circuit 23 is electrically connected to the electrical wiring of circuit board 4 so as to be able to receive the electrical signal indicating the physical property of bearing 2 detected by sensor 20.

Generator 3 is configured of magnetic ring 13 and stator 12 including coil 16. Generator 3 generates the AC power by inner ring 6 rotating relative to outer ring 5. The AC power generated by generator 3 is output to power supply circuit 19 through wire 11. Power supply circuit 19 performs the rectification processing of the input AC power and converts the AC power into the DC power. Power supply circuit 19 supplies the converted DC power to sensor 20 and wireless communication circuit 23.

Each of sensor 20 and wireless communication circuit 23 is operated by the supplied DC power. Sensor 20 detects the physical property (temperature, acceleration, or the like) of bearing 2. Temperature sensor 21 detects the temperature of the constructional member in bearing 2. Acceleration sensor 22 detects the acceleration of the constructional member in bearing 2. The physical property detected by sensor 20 is output to wireless communication circuit 23 as an electric signal. Wireless communication circuit 23 wirelessly transmits the output of sensor 20 to the outside (for example, a receiving unit 50).

Effects

An advantageous effect of the first embodiment will be described below.

According to the first embodiment, as illustrated in FIG. 2, stator 12 is supported by first seal 9, and power supply circuit 19, sensor 20, and wireless communication circuit 23 are supported by second seal 10. For this reason, stator 12 can be disposed over the entire circumference of first seal 9. Furthermore, when stator 12 is brought close to magnetic ring 13, power supply circuit 19, sensor 20, and wireless communication circuit 23 do not become obstacles. Therefore, the gap between stator 12 and magnetic ring 13 is easily narrowed, and the power generation efficiency can be enhanced. For this reason, the sufficient power can be secured and supplied to circuit board 4.

Stator 12 is supported by first seal 9, and sensor 20 is supported by second seal 10. For this reason, heat generated in stator 12 during rotation of bearing 2 is less likely to be conducted to sensor 20. For this reason, temperature rise generated by the rotation of bearing 2 can be accurately detected by sensor 20. This enables temperature sensor 21 to accurately detect the heat generated by the rotation of bearing 2 without being affected by the heat generated by generator 3. For example, when temperature sensor 21 is disposed so as to be opposite to rolling element 7 or retainer 8 with a minute gap, or when temperature sensor 21 is disposed so as to be close to or in contact with inner peripheral surface 5f of outer ring 5, the heat generation due to friction between rolling element 7 and the orbital planes of outer ring 5 and inner ring 6 or friction between rolling element 7 and retainer 8 can be detected. For this reason, temperature sensor 21 can also be used for abnormality monitoring of bearing 2.

In addition, stator 12 and sensor 20 are disposed separately as first seal 9 and second seal 10, so that stator 12 and sensor 20 can be compactly accommodated within the size of the standard bearing. For this reason, bearing device 1 can be made to a bearing with a wireless sensor within the size of the standard bearing.

Wire 11 is disposed in groove 5b provided on the outer peripheral surface of outer ring 5. Thus, wire 11 can be protected in groove 5b, and wire 11 is prevented from protruding from the outer peripheral surface of outer ring 5.

According to the first embodiment, as illustrated in FIG. 2, wire 11 is provided on the end face of outer ring 5 and disposed in grooves 5a, 5c connected to groove 5b. Thus, wire 11 can be protected in grooves 5a, 5c, and wire 11 is prevented from protruding from the end face of outer ring 5.

According to the first embodiment, as illustrated in FIG. 2, stator 12 is in contact with outer ring 5 and inner ring 6 with heat insulating unit 18 interposed therebetween. In this manner, stator 12 of generator 3 is insulated from outer ring 5 and inner ring 6 by heat insulating unit 18. For this reason, an amount of the heat generated in stator 12 to be conducted to outer ring 5 and inner ring 6 is prevented.

According to the first embodiment, core metal 9a in FIG. 2 is made of either the magnetic material or the soft magnetic material. This improves the power generation efficiency.

According to the first embodiment, as illustrated in FIG. 2, second seal 10 includes reinforcing member 10a, and reinforcing member 10a is made of the insulating material (the non-conductive member: for example, a resin material, a fiber-reinforced resin, or a carbon fiber). Thus, the conductive material such as metal does not exist around the antenna in wireless communication circuit 23. For this reason, the radio wave can be transmitted to the outside of bearing 2 without opening a window in second seal 10.

Even when reinforcing member 10a of second seal 10 is made of metal (magnetic material) such as a rolled steel plate, rubber lip 10b and seal lip 10c are disposed on the outer periphery and the inner periphery of second seal 10, and rubber lip 10b and seal lip 10c are made of the insulator such as rubber. Thus, because wireless communication circuit 23 has a structure that is not sealed with the conductive material such as metal, the case where the wireless communication becomes possible is also assumed.

According to the first embodiment, the plurality of rolling elements 7 in FIG. 2 are made of the insulating material. Thus, the space sandwiched between outer ring 5 and inner ring 6 becomes the insulator, and rubber lip 9b and seal lip 9c of first seal 9 are the insulator such as rubber, so that wireless communication can be performed subject to a condition of a size of the insulator.

According to the first embodiment, as illustrated in FIG. 2, because rubber lip 10b provided on the outer peripheral portion of second seal 10 and seal lip 10c provided on the inner peripheral portion are made of rubber, rubber lip 10b and seal lip 10c become heat insulating unit 24. Thus, circuit board 4 is insulated from outer ring 5 and inner ring 6. Heat insulating unit 24 prevents heat conduction of the heat generated by stator 12 to circuit board 4 and reduces the influence of the heat. For this reason, only the heat generated by the rotation of bearing 2 can be detected by temperature sensor 21 without being affected by the heat generated by stator 12.

Stator 12 and circuit board 4 are in contact with bearing 2 with heat insulating units 18, 24 interposed therebetween. For this reason, even when the heat is generated due to iron loss of stator 12 or the like, the heat conduction to the side of bearing 2 is prevented, and the temperature rise accompanying the rotation of the bearing is accurately measured.

According to the first embodiment, as illustrated in FIG. 2, circuit board 4 is fixed to bearing 2 while rubber lip 10b provided on the outer peripheral portion of second seal 10 is interposed between circuit board 4 and bearing 2. For this reason, when acceleration sensor 22 is mounted on circuit board 4, it is also assumed that vibration transmitted to acceleration sensor 22 is attenuated. Therefore, preferably the attenuation amount of the acceleration is grasped by performing previously a vibration test. When the accurate acceleration is required to be known, acceleration sensor 22 may be fixed to inner peripheral surface 5f of outer ring 5 (fixed wheel). 20

When bearing device 1 is used at a low speed and a large load, grooves 5a, 5b, 5c of outer ring 5 are preferably disposed at positions different from a main load direction.

Second Embodiment

<Configuration of Bearing Device>

Figure 7:
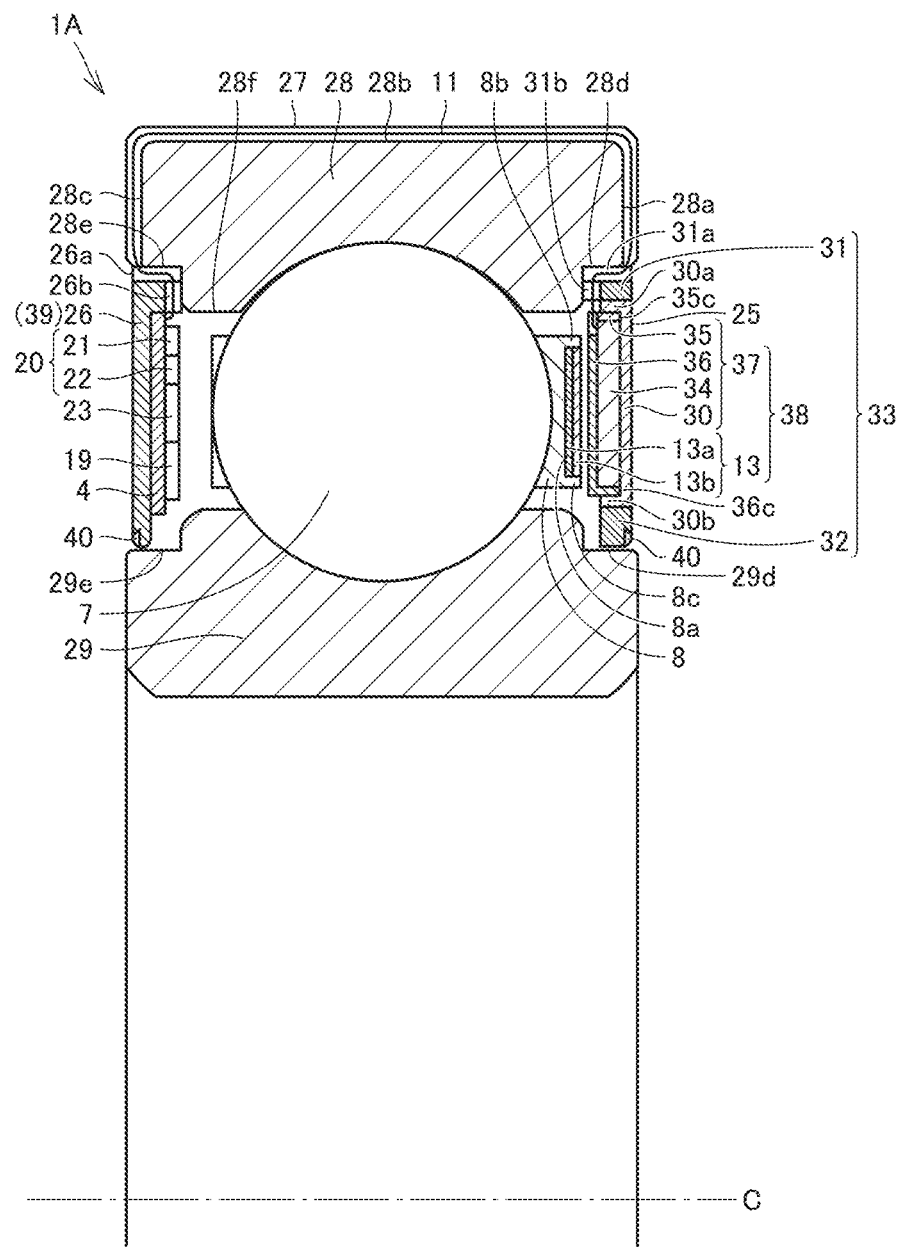
FIG. 7 is a partially enlarged sectional view illustrating a part of a bearing device according to a second embodiment.
Figure 8:
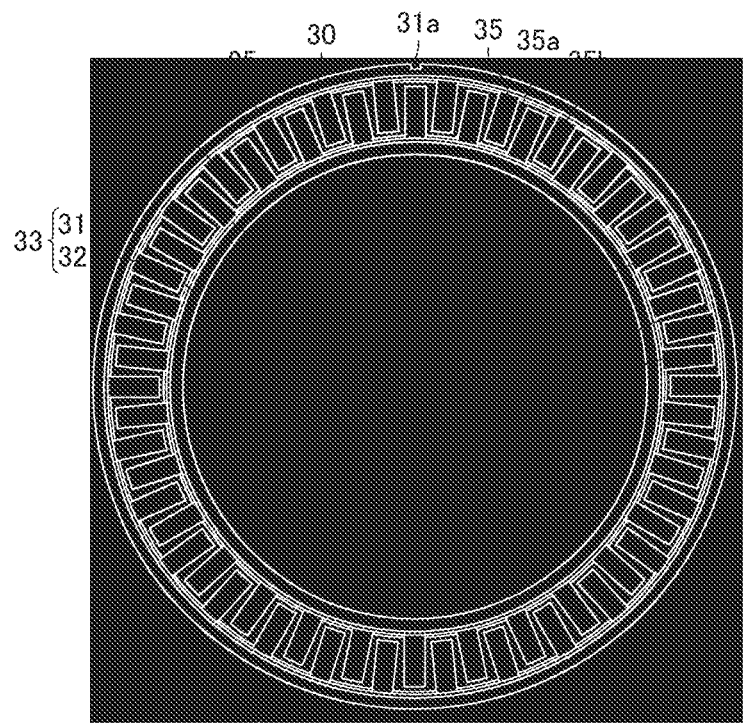
FIG. 8 is a side view illustrating an inner end face of a first seal viewed from the inside of the bearing in FIG. 7.
Figure 9:
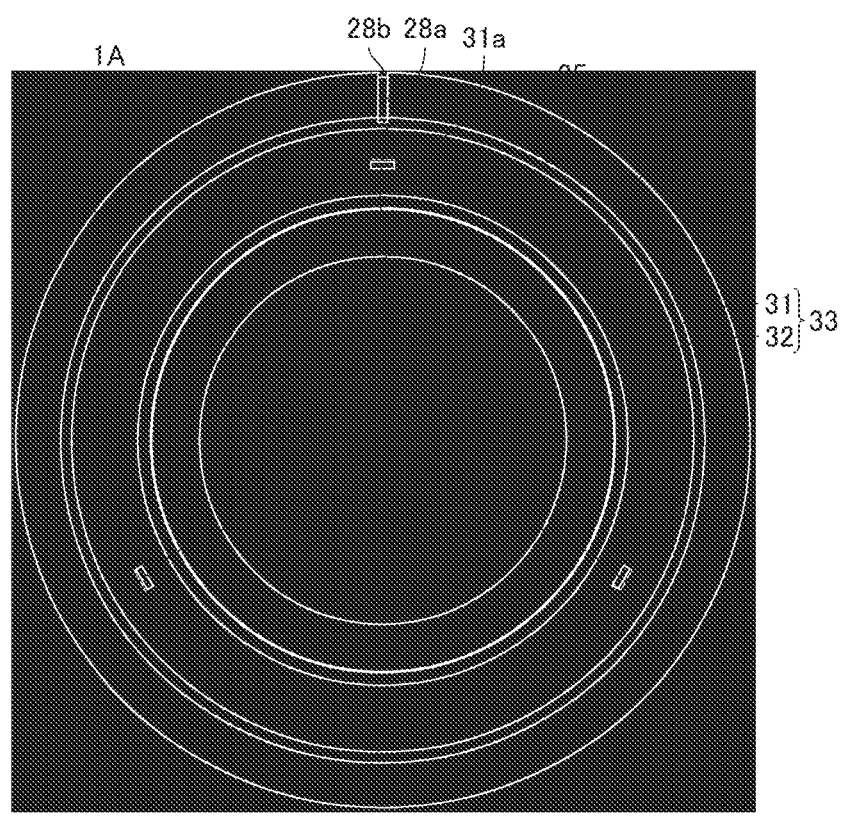
FIG. 9 is a side view illustrating the bearing device in which a detaching unit is formed on an outer end face of the stator member as viewed from the first seal side.

With reference to FIGS. 7 to 9, a configuration of a bearing device according to a second embodiment will be described below.

As illustrated in FIG. 7, a bearing device 1A of the second embodiment includes a first seal 25 and a second seal 26 instead of first seal 9 and second seal 10 of bearing device 1 of the first embodiment. Bearing device 1A of the second embodiment includes an outer ring 28 and an inner ring 29 in which seal grooves 5d, 5e, 6d, 6e of outer ring 5 and inner ring 6 of the first embodiment are abolished.

A bearing 27 in bearing device 1A includes an outer ring 28, an inner ring 29, the plurality of rolling elements 7, retainer 8, first seal 25, and second seal 26. Each of outer ring 28 and inner ring 29 is the bearing ring having the orbital plane and has the annular shape. Inner ring 29 is disposed on the radial inside of outer ring 28. Outer ring 28 and inner ring 29 are concentrically disposed. Each of the plurality of rolling elements 7 is rollably disposed in the annular space between outer ring 28 and inner ring 29. Each of the plurality of rolling elements 7 is disposed so as to abut on each of the orbital plane of outer ring 28 and the orbital plane of inner ring 29. Retainer 8 has an annular shape and is made of, for example, resin. Retainer 8 holds the plurality of rolling elements 7 at intervals in a circumferential direction so as to be rollable.

Each of first seal 25 and second seal 26 has the annular shape and is disposed between outer ring 28 and inner ring 29. First seal 25 and second seal 26 seal the annular space by sandwiching retainer 8 therebetween. A lubricant such as lubricating grease is put in the annular space sealed by first seal 25 and second seal 26.

Grooves 28a, 28b, 28c are formed in the axial direction of the outer periphery of outer ring 28 and in the radial direction of the end face. Groove 28b (first groove) of outer ring 28 is provided on the outer peripheral surface of outer ring 28. For example, groove 28b extends in the axial direction (the direction parallel to shaft line C) of bearing 27 on the outer peripheral surface of outer ring 28. Groove 28a (second groove) of outer ring 28 is provided on the end face of outer ring 28 on the side of first seal 25. For example, groove 28a extends in the radial direction of bearing 27 on the end face of outer ring 28 on the side of first seal 25, and is connected to groove 28b. Groove 28c (second groove) of outer ring 28 is provided on the end face of outer ring 28 on the side of second seal 26. For example, groove 28c extends in the radial direction of bearing 27 on the end face of outer ring 28 on the side of second seal 26, and is connected to groove 28b.

Stepped units 28d, 28e are formed on an inner peripheral surface 28f at both ends in the axial direction of outer ring 28. Stepped units 29d, 29e are formed on the outer peripheral surface of inner ring 29. The outer peripheral end of first seal 25 is press-fitted and fixed to stepped unit 28d of outer ring 28, and tan inner peripheral end of first seal 25 is opposite to stepped unit 29d of inner ring 29 with a gap. The outer peripheral end of the second seal 26 is press-fitted and fixed to stepped unit 28e of outer ring 28, and an inner peripheral end of second seal 26 is opposite to stepped unit 29e of inner ring 29 with a gap.

First seal 25 includes a stator member 30, an outer peripheral member 31, and an inner peripheral member 32. Stator member 30 has the annular shape with a "C" section made of the magnetic metal material. Outer peripheral member 31 is made of the insulating material (for example, the resin material) and fixed to the outer periphery of stator member 30. Inner peripheral member 32 is made of the insulating material (for example, the resin material) and fixed to the inner periphery of stator member 30. Outer peripheral member 31 and inner peripheral member 32 serve as a heat insulating unit 33 to insulate stator member 30 from outer ring 28 and inner ring 29.

Second seal 26 has the annular shape and is made of the insulating material (for example, the resin material).

For example, polyphenylene sulfide (PPS), polyamide (PA), polyacetal (POM), or polybutylene terephthalate (PBT) having low thermal conductivity is used as the resin material of each of outer peripheral member 31 and inner peripheral member 32 of first seal 25 and second seal 26.

Bearing device 1A of the second embodiment further includes a generator 38, circuit board 4, power supply circuit 19, sensor 20, and wireless communication circuit 23.

For example, generator 38 is a claw pole generator, and includes a stator 37 and magnetic ring 13. Stator 37 is attached to an inner end face of first seal 25 opposite to retainer 8. Magnetic ring 13 is attached to the end face on the non-release side of retainer 8 opposite to first seal 25. Stator 37 and magnetic ring 13 are opposite to each other with a gap in the axial direction of bearing 27.

Magnetic ring 13 is fixed to recess 8a provided on the end face on the non-release side of retainer 8 by fitting, by fixing with the adhesive, or using both. A reversal (not illustrated) or the like may be provided in protrusions 8b, 8c provided at both ends of recess 8a to prevent magnetic ring 13 from being detached from recess 8a.

Magnetic ring 13 includes a core metal 13a and a multipolar magnet 13b. Multipolar magnet 13b is disposed so as to sandwich core metal 13a between retainer 8 and multipolar magnet 13b, and supported by retainer 8 with core metal 13a interposed therebetween. Multipolar magnet 13b is opposite to stator 37 with a gap in the axial direction of bearing 27. For example, multipolar magnet 13b is formed by vulcanizing and bonding a magnetic material obtained by kneading magnetic powder and rubber to core metal 13a, and then alternately magnetizing N poles and S poles in the circumferential direction as illustrated in FIG. 3.

Stator 37 includes stator member 30, two magnetic ring members 35, 36, and a coil 34. Magnetic ring members 35, 36 accommodating coil 34 are fixed to the end face (inside side surface) of stator member 30 on the side of retainer 8. Coil 34 has the same configuration as that in FIG. 5. For example, magnetic ring members 35, 36 are made of the metal material (magnetic material) such as the rolled steel plate.

As illustrated in FIG. 8, grooves 35a and claws 35b opened in the axial direction of bearing 27 are alternately arranged in the comb shape in the circumferential direction at one end of magnetic ring member 35. At one end of magnetic ring member 36, grooves 36a and claws 36b opened in the axial direction of bearing 2 are alternately arranged in the comb shape in the circumferential direction. Claws 35b, 36b provided on two magnetic ring members 35, 36 are alternately arranged in the circumferential direction. Coil 34 is accommodated therein.

As illustrated in FIG. 7, the other end 35c of magnetic ring member 35 abuts on a bent unit 30a of stator member 30 to form the magnetic path. The other end 36c of magnetic ring member 36 abuts on a bent unit 30b of stator member 30 to form the magnetic path.

Stator 37 is configured by inserting coil 34 into the magnetic path formed by stator member 30 and magnetic ring members 35, 36. The other ends 35c, 36 c of magnetic ring members 35, 36 are press-fitted and fixed to the inner peripheral surfaces of bent units 30a, 30b of stator member 30, or fixed in combination with the adhesive. Stator 37 and magnetic ring 13 disposed opposite to stator 37 configure generator 38.

Furthermore, similarly to the first embodiment, when the soft magnetic material having the high magnetic permeability is used as the material of stator member 30 and magnetic ring members 35, 36, the power generation efficiency is improved.

Stator 37 is not in direct contact with outer ring 28 and inner ring 29, and is supported by bearing 27 with a member (outer peripheral member 31, inner peripheral member 32) made of a material (for example, rubber or resin) having the low thermal conductivity (high thermal insulation property) interposed therebetween. Accordingly, stator 37 is thermally insulated from outer ring 28 and inner ring 29. For this reason, even when the heat is generated due to the iron loss of stator 37 or the like, the heat conduction to outer ring 28 and inner ring 29 is prevented.

Stator 37 provided on the side surface of first seal 25 is arranged over the entire circumference in the circumferential direction around shaft line C, and the height of stator 37 is uniform. Thus, the gap between stator 37 and multipolar magnet 13b of magnetic ring 13 fixed to retainer 8 can be narrowed, so that the power generation efficiency is improved.

Stator 37 includes a first surface on the side of retainer 8 and a second surface that is a back surface of the first surface. The second surface of stator 37 is exposed to the outside from heat insulating unit 33. For this reason, stator member 30 functions as a heat radiation plate. In order to enhance heat dissipation, unevenness (not illustrated) may be provided on the exposed surface of stator member 30 to increase a surface area of the exposed surface.

Notches 31a, 31b are provided at one location in the circumferential direction in first seal 25. Notch 31a is provided on the outer periphery of outer peripheral member 31. Notch 31b is provided on the inside side surface of outer peripheral member 31 and communicates with notch 31a. Notches 31a, 31b are used for pulling out wire 11 connected to coil 34 from the space (annular space) between outer ring 28 and inner ring 29 to the outside.

Stator member 30 is shared by stator 37 and first seal 25. As described above, using stator member 30 of first seal 25 as the component of the magnetic path, the number of components can be reduced and stator 37 can be thinned.

Circuit board 4 is fixed to the surface of second seal 26 on the side of rolling element 7 by the adhesion or the like. Circuit board 4 includes electric wiring. A protective film such as resin may be applied to the surface of circuit board 4. Power supply circuit 19, sensor 20, and wireless communication circuit 23 are mounted on circuit board 4. Each of power supply circuit 19, sensor 20, and wireless communication circuit 23 is electrically connected to the electric wiring of circuit board 4.

Power supply circuit 19 performs rectification processing of the AC power generated by generator 38 when inner ring 29 rotates and converts the AC power into the DC power. Power supply circuit 19 supplies the power (DC power) converted into DC to each of sensor 20 and wireless communication circuit 23. Each of sensor 20 and wireless communication circuit 23 is operated by the power supplied from power supply circuit 19.

For example, sensor 20 is a sensor that monitors the state of bearing 27, and detects the physical property (temperature, acceleration, or the like) of bearing 27. Sensor 20 may be one sensor or include a plurality of sensors. For example, sensor 20 may include a temperature sensor 21 and an acceleration sensor 22. Temperature sensor 21 is preferably mounted at a position close to a constructional member of bearing 27, for example, at a position close to inner peripheral surface 28f of outer ring 28, or at a position close to retainer 8 and rolling element 7. Sensor 20 may not be mounted on circuit board 4, but may be directly fixed to the stationary wheel of bearing 27 and connected to circuit board 4 by wiring (not illustrated).

Wireless communication circuit 23 wirelessly transmits the output of sensor 20 to the outside. For example, in the case where Bluetooth Low Energy (a frequency is 2.4 GHz and a wavelength λ is about 125 mm) is used as wireless communication circuit 23, the radio wave is easily emitted to the outside of bearing device 1A when the gap of the insulator wider than 22 exists.

When signal processing of sensor 20 is required, the circuitry is mounted on circuit board 4. A battery (storage battery) (not illustrated) may be mounted on circuit board 4. The battery may be used as a power supply when the power supply is stabilized and when power cannot be generated.

Second seal 26 is formed by a resin material having low thermal conductivity, and second seal 26 serves as heat insulating unit 39 to prevent the heat conduction from outer ring 28 to circuit board 4. For this reason, temperature sensor 21 mounted on circuit board 4 can measure only the temperature rise accompanying the rotation of bearing 27. Notches 26a, 26b are provided at one location in the circumferential direction in second seal 26. Notch 26a is provided on the outer periphery of second seal 26. Notch 26b is provided on the inside side surface of second seal 26 and communicates with notch 26a. Notches 26a, 26b is used for pulling out wire 11 connected to circuit board 4 from the space (annular space) between outer ring 28 and inner ring 29 to the outside.

Circuit board 4 on which wireless communication circuit 23 is mounted is fixed to second seal 26 made of the insulator (non-conductive material). For this reason, wireless communication circuit 23 including the antenna mounted on circuit board 4 has a structure that is not sealed with the conductive material such as metal, and the wireless communication can be performed.

Wire 11 connected to coil 34 is drawn out from the space (annular space) between outer ring 28 and inner ring 29 through notches 31a, 31b of outer peripheral member 31. Wire 11 drawn out from the annular space is disposed in grooves 28a, 28b, 28c of outer ring 28. Groove 28b of outer ring 28 extends in the axial direction of bearing 27 on the outer peripheral surface of outer ring 28. Groove 28a of outer ring 28 extends in the radial direction on the end face of outer ring 28 on the side of first seal 25 and is connected to groove 28b. Groove 28c of outer ring 28 extends in the radial direction on the end face of outer ring 28 on the side of second seal 26, and is connected to groove 28b. Wire 11 is connected to circuit board 4 through notches 26a, 26b of second seal 26 through grooves 28a, 28b, 28c. Thus, generator 38 and power supply circuit 19 are electrically connected.

Furthermore, a detaching unit 40 is formed in first seal 25 and second seal 26. Detaching unit 40 is a wedge-shaped notch configured to be able to insert a jig such as a negative screwdriver (not illustrated). For example, detaching unit 40 includes a surface inclined with respect to the axial direction of bearing 27, and thus includes a part protruding in an eaves shape at an outer end face of each of first seal 25 and second seal 26. A tip of a flathead screwdriver or the like is inserted into detaching unit 40, and the tip is moved to the side opposite to retainer 8 while being hooked on the eaves protruding part of detaching unit 40, so that each of first seal 25 and second seal 26 can be detached from bearing 27.

In FIG. 7, at least one detaching unit 40 that is a wedge-shaped notch is formed on the outer end face of inner peripheral member 32 of first seal 25. Similarly, at least one detaching unit 40 is formed on the outer end face close to the inner peripheral surface of second seal 26.

Because bearing device 1A of the second embodiment includes circuit board 4 on which generator 38 and sensor 20 are mounted, bearing device 1A is more expensive than a standard bearing price. When peeling or the like is generated on the bearing rolling surface during use of bearing device 1A to require replacement of bearing device 1A, it is economically burdensome to replace entire bearing device 1A. When first seal 25 and second seal 26 can be reused, the replacement cost can be reduced.

When bearing device 1A needs to be replaced, first seal 25 and second seal 26 are removed from bearing 27 using a jig (not illustrated), and then magnetic ring 13 is replaced with new bearing 27 that is previously fixed to retainer 8. Magnetic ring 13 fixed to retainer 8 may also be removed from retainer 8, and reused.

In addition, wire 11 may be peeled off from grooves 28a, 28b, 28c of outer ring 28 so as not to be disconnected, and reused. Wire 11 may be replaced with new wire 11.

The formation position of detaching unit 40 is not limited, but for example, detaching unit 40 may be provided on the outer end face of stator member 30. As illustrated in FIG. 9, at least one detaching unit 40 having the wedge-shaped notch shape is provided on the outer end face of stator member 30 of first seal 25. For example, three detaching units 40 spaced apart from each other in the circumferential direction may be provided at the outer end face of stator member 30 of first seal 25.

Similarly to first seal 25, the outer end face of second seal 26 may also be provided with detaching unit 40. In the above description, detaching unit 40 has the wedge-like notch shape. However, the shape of detaching unit 40 is not limited to the wedge-like notch shape as long as it can hook a tool such as a flathead screwdriver.

As in the first embodiment illustrated in FIGS. 1 and 2, when seal lips 9c, 10c of first seal 9 and second seal 10 are formed of an elastic body such as rubber, the jig can be easily inserted, so that the formation of the detaching unit is not required.

Effects

Also in the second embodiment, the effects similar to those of the first embodiment can be obtained.

According to the second embodiment, as illustrated in FIG. 7, the surface (second surface) of stator 37 on the side opposite to the side of retainer 8 is exposed to the outside from heat insulating unit 33. Thus, stator member 30 functions as a heat radiation plate.

According to the second embodiment, as illustrated in FIG. 7, first seal 25 and second seal 26 include detaching unit 40 detached from outer ring 28 and inner ring 29. Thus, first seal 25 and second seal 26 can be reused, and the replacement cost can be reduced.

Modification

Figure 10:
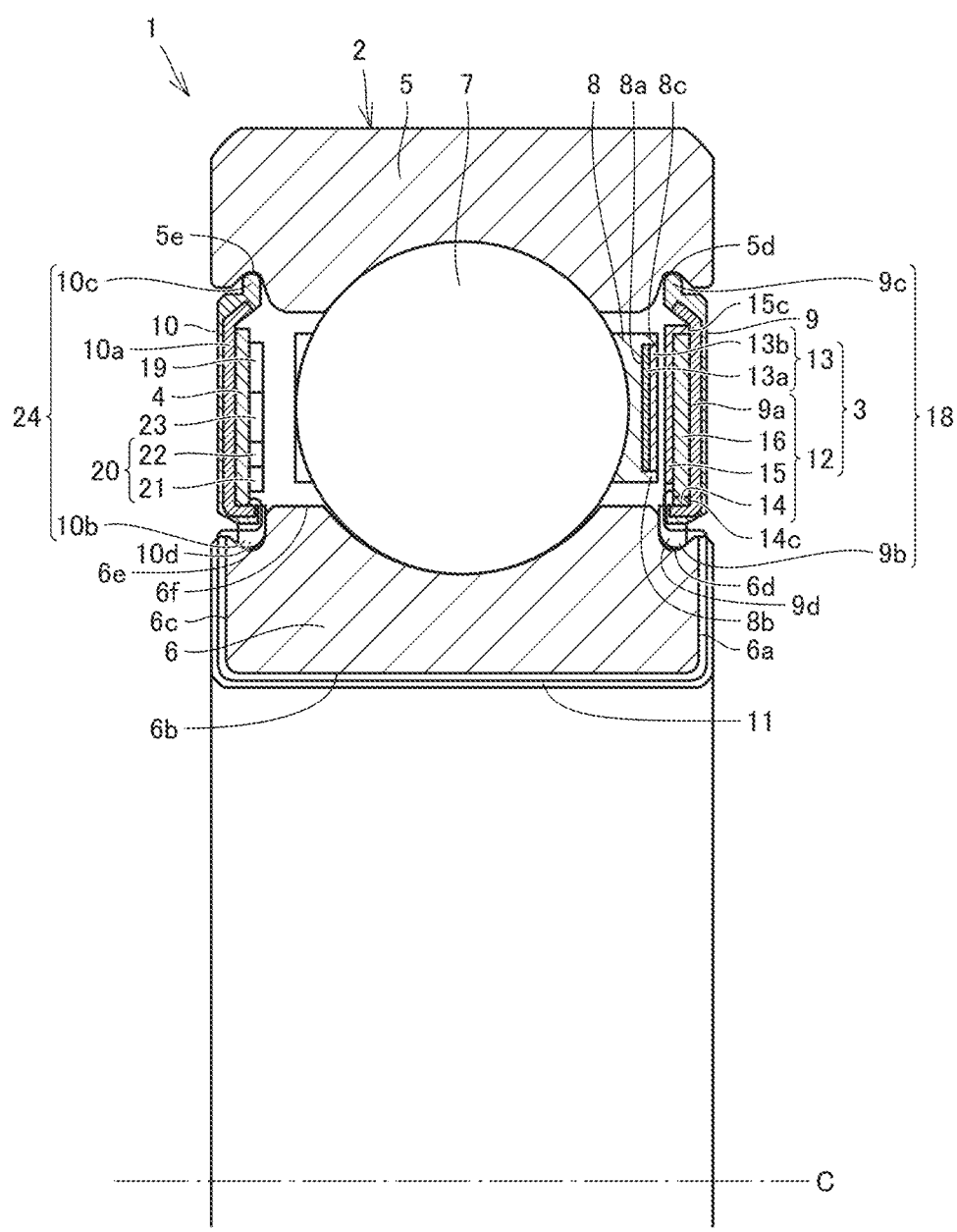
FIG. 10 is a partially enlarged sectional view illustrating a part of a bearing device according to a modification.

With reference to FIG. 10, a configuration of a bearing device according to a modification will be described below.

As illustrated in FIG. 10, the modification is different from the first embodiment in FIGS. 1 and 2 in that wire 11 drawn out from the annular space is disposed in the grooves 6a, 6b, 6c of inner ring 6. Groove 6b of inner ring 6 is provided on the inner peripheral surface of inner ring 6. For example, groove 6b extends in the axial direction (the direction parallel to shaft line C) of bearing 2 on the inner peripheral surface of inner ring 6. Groove 6a of inner ring 6 is provided on the end face of inner ring 6 on the side of first seal 9. For example, groove 6a extends in the radial direction of bearing 2 on the end face of inner ring 6 on the side of first seal 9, and is connected to groove 6b. Groove 6c of inner ring 6 is provided on the end face of inner ring 6 on the side of second seal 10. For example, groove 6c extends in the radial direction of bearing 2 on the end face of inner ring 6 on the side of second seal 10, and is connected to groove 6b.

The modification is different from the first embodiment in FIGS. 1 and 2 in that each of notches 9d, 10d is opened to the inner peripheral ends of first seal 9 and second seal 10. Notch 9d is used for pulling out a wire 11 connected to coil 16 from the space (annular space) between outer ring 5 and inner ring 6 to the outside. Notch 10d is used for pulling out wire 11 connected to circuit board 4 from the space (annular space) between outer ring 5 and inner ring 6 to the outside.

Wire 11 connected to coil 16 is pulled out from the space (annular space) between outer ring 5 and inner ring 6 through notch 9d provided on the inner periphery of rubber lip 9b of first seal 9. Wire 11 drawn out from the annular space passes through grooves 6a, 6b, 6c of inner ring 6, and is connected to circuit board 4 through notch 10d provided on the outer periphery of rubber lip 10b of second seal 10. Thus, generator 3 and power supply circuit 19 are electrically connected.

Also in bearing device 1A of the second embodiment in FIG. 7, wire 11 drawn out from the annular space may be disposed in a groove provided in the end face and the outer peripheral surface of inner ring 29.

Although the deep groove ball bearing has been described above as an example of bearings 2, 27, other types of rolling bearings, for example, angular ball bearings may be used, and the type of bearing is not limited.

In the above description, the claw pole generator has been described as an example of generators 3, 38, but other types of generators may be employed. In the claw pole generator, the multipolar magnet is easily arranged in the circumferential direction, and the compact claw pole generator can efficiently generate power even in the case of low-speed rotation.

[Configuration of Electric Vertical Take-Off and Landing Aircraft]

In recent years, a flying automobile, what is called a flying car, attracts attention as means of transportation instead of the automobile. The flying car is expected to be used in various situations such as intra-regional movement, inter-regional movement, tourism and leisure, emergency medical care, and disaster rescue.

As the flying car, a vertical take-off and landing aircraft (VTOL) has attracted attention. Since the vertical take-off and landing aircraft can vertically ascend and descend between the sky and a landing place, the vertical take-off and landing aircraft does not require a runway and is excellent in convenience. In particular, in recent years, an electric vertical take-off and landing aircraft (eVTOL) of a type of flying with a battery and a motor has become the mainstream of development due to social demands for reduction of $CO_2$ and the like.

Figure 11:
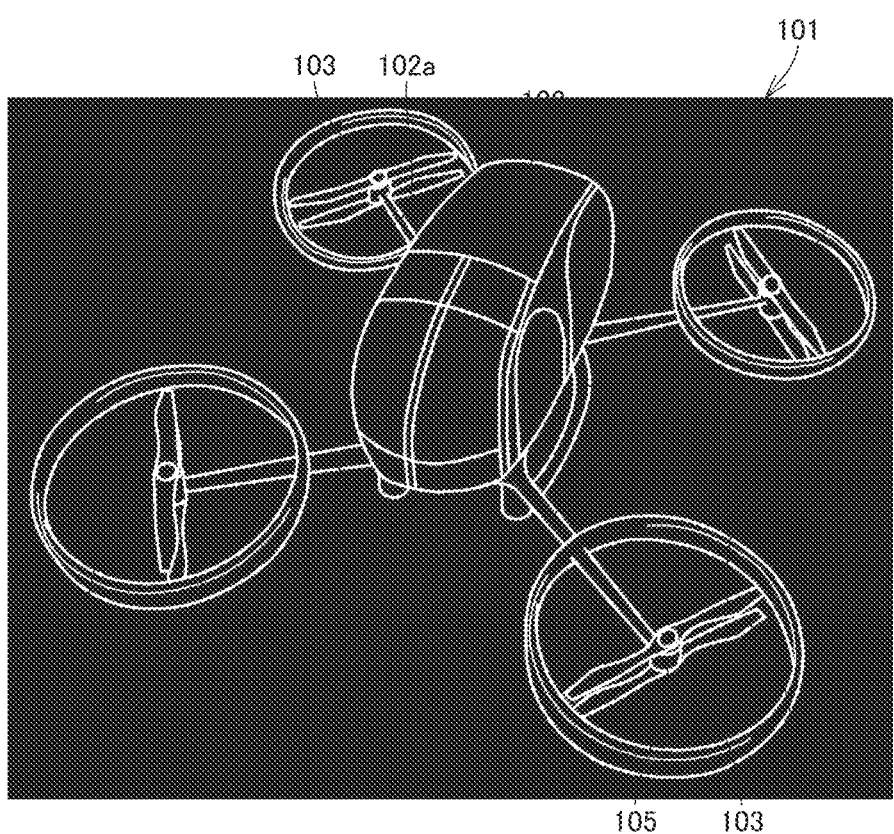
FIG. 11 is a perspective view illustrating an electric vertical take-off and landing aircraft on which the bearing device of the first or second embodiment or the modification is mounted.
Figure 12:
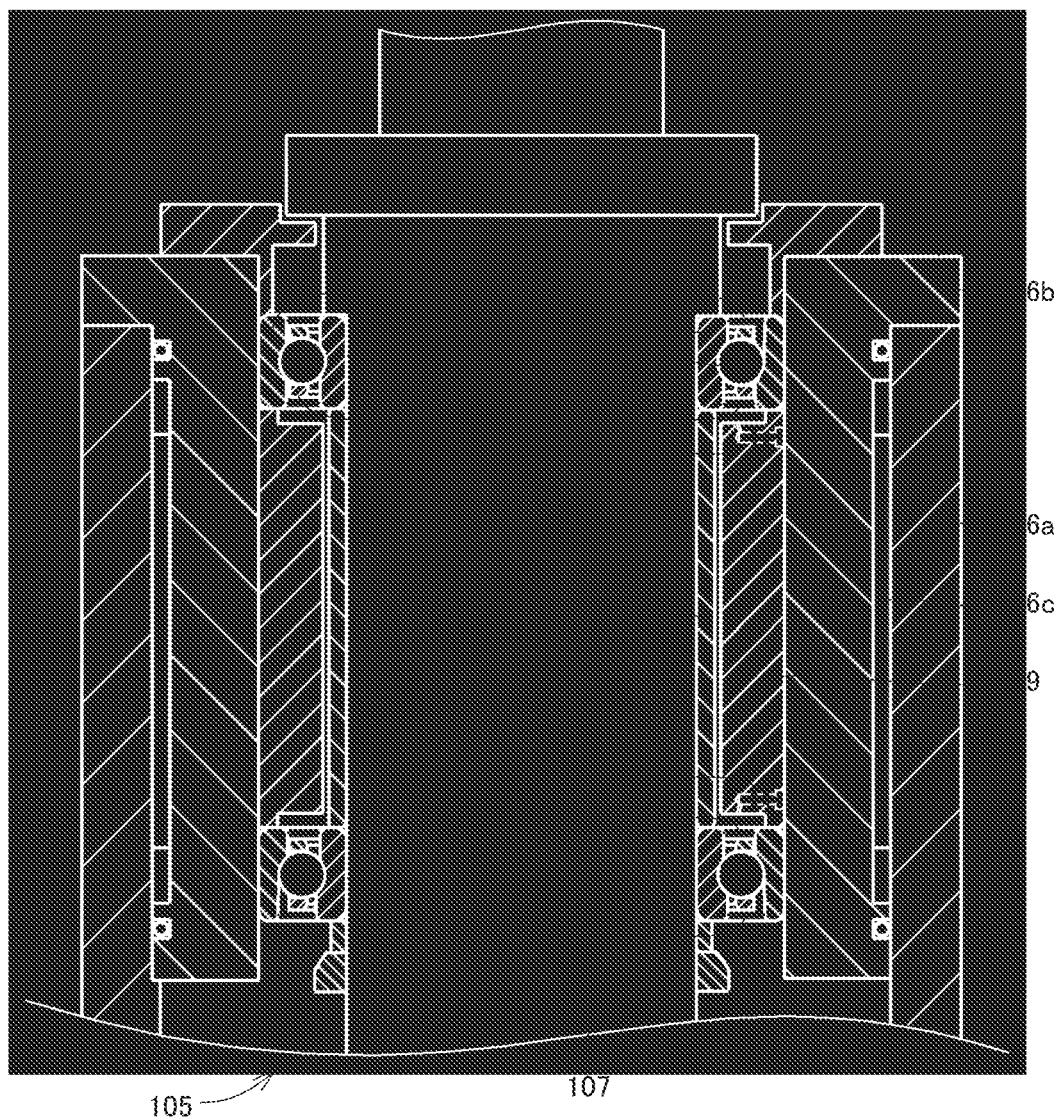
FIG. 12 is a sectional view illustrating a rotor blade support structure in the electric vertical take-off and landing aircraft in FIG. 11.

The bearing device of the first or second embodiment or the modification may be mounted on the electric vertical take-off and landing aircraft. With reference to FIGS. 11 and 12, a configuration of the electric vertical take-off and landing aircraft on which the bearing device of the first embodiment is mounted will be described as an example.

As illustrated in FIG. 11, a vertical take-off and landing aircraft 101 is a multicopter including a body unit 102 located at the center of an airframe and four driving units 103 arranged in front, rear, left, and right. Driving unit 103 is a device that generates lift and propulsion of vertical take-off and landing aircraft 101. Vertical take-off and landing aircraft 101 flies by driving of driving unit 103. In vertical take-off and landing aircraft 101, the number of driving units 103 may be plural but is not limited to four.

Body unit 102 has a living space in which an occupant (for example, about one to two persons) can board. An operation system that determines a traveling direction, an altitude, and the like and an instrument that indicates an altitude, a speed, a flight position, and the like are provided in the living space. Four arms 102a extend from body unit 102, and driving unit 103 is provided at the tip of each arm 102a. An annular portion that covers the rotation periphery of rotor blade 104 is integrally provided in arm 102a in order to protect rotor blade 104. Furthermore, a skid 102b that supports the airframe during the landing is provided at a lower portion of body unit 102.

Driving unit 103 includes a pair of upper and lower rotor blades 104 and a motor 105 that rotates rotor blades 104. In driving unit 103, the pair of upper and lower rotor blades 104 is provided on both sides in the axial direction across motor 105. Each of the pair of upper and lower rotor blades 104 has two blades extending radially outward.

A battery (not illustrated) and a control device (not illustrated) are provided in body unit 102. The control device is also referred to as a flight controller. For example, the control of vertical take-off and landing aircraft 101 is performed by the control device as follows. The control device outputs a command to change rotation speed to motor 105 in which the lift is to be adjusted based on the difference between a current attitude and a target attitude. Based on the command, an amplifier included in motor 105 adjusts the amount of power sent from the battery to motor 105, and the rotation speed of motor 105 (and rotor blade 104) is changed. The rotation speed of motor 105 is adjusted simultaneously for the plurality of motors 105, thereby determining the attitude of the airframe.

As illustrated in FIG. 12, the above-described upper rotor blade is attached to one end side (upper side in FIG. 12) of a rotation axis 107 of motor 105, and a rotor (not illustrated) of motor 105 is attached to the other end side (lower side in FIG. 12). The rotor is disposed opposite to the stator (not illustrated) fixed to a housing 106, and is rotatable with respect to the stator. A configuration of an outer rotor type brushless motor or an inner rotor type brushless motor can be adopted as motor 105.

Motor 105 includes housing (device housing) 106, the rotor, the stator, the amplifier (not illustrated), and two bearing devices 1, 1. Housing 106 includes an outer cylinder 106a and an inner cylinder 106b, and includes a cooling medium passage 106c between outer cylinder 106a and inner cylinder 106b. An excessive temperature rise is prevented by allowing a cooling medium to flow through cooling medium passage 106c. The material of housing 106 is not particularly limited, but for example, and may be an iron-based material or carbon fiber reinforced plastic (CFRP).

Bearing device 1 has the same configuration as bearing device 1 of the first embodiment in FIGS. 1 to 5. Bearing device 1 rotatably supports rotation axis 107 in housing 106. The outer shape of outer ring 5 of bearing device 1 is the same as the fitting portion of the inner periphery of housing 106, and is directly fitted to housing 106 without interposing the bearing housing or the like. An inner ring spacer 108 and an outer ring spacer 109 are inserted between two bearing devices 1, 1, and a preload is applied to each of outer ring 5 and inner ring 6.

The bearing configuration of the driving unit is not limited to the configuration in FIG. 12. In FIG. 12, rotation axis 107 of motor 105 and the rotation axis of rotor blade 104 are the same rotation axis, but the rotation axis of motor 105 and the rotation axis of rotor blade 104 may be connected with a transmission mechanism interposed therebetween. In this case, bearing device 1 that supports the rotation axis in the driving unit may be the bearing device that supports the rotation axis of motor 105, or may be the bearing device that supports the rotation axis of the rotor blade.

In FIG. 12, bearing device 1 has been described by taking the angular ball bearing as the example, but bearing device 1 is not limited thereto and may be a deep groove ball bearing.

It should be considered that the disclosed embodiments are illustrative and non-restrictive in every respect. The scope of the present invention is defined by not the description above, but the claims, and it is intended that all modifications within the meaning and scope equivalent to the claims are included in the present invention.

REFERENCE SIGNS LIST 1, 1A: bearing device, 2, 27: bearing, 3, 38: generator, 4: circuit board, 5, 28: outer ring, 5a, 5b, 5c, 6a, 6b, 6c, 14a, 15a, 28a, 28b, 28c, 35a, 36a: groove, 5d, 5e, 6d, 6e: seal groove, 5f, 28f: inner peripheral surface, 6, 29: inner ring, 7: rolling element, 8: retainer, 8a: recess, 8b: protrusion, 9, 25: first seal, 9a, 13a: core metal, 9b, 10b: rubber lip, 9c, 10c: seal lip, 9d, 10d, 26a, 26b, 31a, 31b: notch, 10, 26: second seal, 10a: reinforcing member, 11: wire, 12, 37: stator, 13: magnetic ring, 13b: multipolar magnet, 14, 15, 35, 36: magnetic ring member, 14b, 15b, 35b, 36b: claw, 14c, 15c, 35c, 36c: other end, 16, 34: coil, 16a: terminal, 17: substrate, 18, 24, 33, 39: heat insulating unit, 19: power supply circuit, 20: sensor, 21: temperature sensor, 22: acceleration sensor, 23: wireless communication circuit, 28d, 28e, 29d, 29e: stepped unit, 30: stator member, 30a, 30b: bent unit, 31: outer peripheral member, 32: inner peripheral member, 40: detaching unit, 50: receiving unit, 101: electric vertical take-off and landing aircraft, 102: body unit, 102a: arm, 102b: skid, 103: driving unit, 104: rotor blade, 105: motor, 106: housing, 106a: outer cylinder, 106b: inner cylinder, 106c: cooling medium passage, 107: rotation axis, 108: inner ring spacer, 109: outer ring spacer

The invention claimed is:

1. A bearing device comprising:
a bearing that includes an outer ring, an inner ring disposed on a radially inside of the outer ring, a plurality of rolling elements rollably disposed in an annular space between the outer ring and the inner ring, a retainer that holds the plurality of rolling elements at intervals in a circumferential direction, and a first seal and a second seal that seal the annular space by sandwiching the retainer with the first seal and the second seal;
a magnetic ring that is supported by the retainer and has N poles and S poles alternately arranged;
a stator that is supported by the first seal and has a coil opposite to the magnetic ring;
at least one sensor that is supported by the second seal and detects a physical property of the bearing;
a wireless communication circuit that is supported by the second seal and wirelessly transmits output of the at least one sensor to the outside;
a power supply circuit that is supported by the second seal and supplies DC power generated by performing rectification processing of power generated by a generator including the magnetic ring and the stator to the at least one sensor and the wireless communication circuit; and
a wire that electrically connects the coil and the power supply circuit,
wherein the wire is disposed in a first groove provided on either an outer peripheral surface of the outer ring or an inner peripheral surface of the inner ring.

2. The bearing device according to claim 1, wherein the wire is provided in one of an end face of the outer ring and an end face of the inner ring and disposed in a second groove connected to the first groove.

3. The bearing device according to claim 1, further comprising a heat insulating unit disposed on an outer peripheral side and an inner peripheral side of the stator in a radial direction of the bearing,
wherein the stator abuts on at least one of the outer ring and the inner ring with the heat insulating unit interposed therebetween.

4. The bearing device according to claim 3, wherein the stator includes a core metal, and
the core metal is made of either a magnetic material or a soft magnetic material.

5. The bearing device according to claim 3, wherein the stator includes a first surface on the retainer side and a second surface that is a back surface of the first surface, and
the second surface of the stator is exposed to an outside from the heat insulating unit.

6. The bearing device according to claim 1, wherein the second seal includes a reinforcing member, and the reinforcing member is made of an insulating material.

7. The bearing device according to claim 1, wherein the plurality of rolling elements are made of an insulating material.

8. The bearing device according to claim 1, wherein at least one of the first seal and the second seal includes a detaching unit detached from the inner ring and the outer ring.

9. An electric vertical take-off and landing aircraft comprising:
    the bearing device according to claim 1; and
    a rotor blade rotatably supported by the bearing device,
    wherein the electric vertical take-off and landing aircraft flies by rotation of the rotor blades.

* * * * *